(12) United States Patent
Chen

(10) Patent No.: US 7,584,935 B2
(45) Date of Patent: Sep. 8, 2009

(54) STAND FOR A MACHINE

(75) Inventor: Jung-Huo Chen, Taichung Hsien (TW)

(73) Assignee: Rexon Industrial Corporation, Ltd., Taichung Hsien (TW)

( * ) Notice: Subject to any disclaimer, the term of this patent is extended or adjusted under 35 U.S.C. 154(b) by 222 days.

(21) Appl. No.: 11/723,768

(22) Filed: Mar. 22, 2007

(65) Prior Publication Data

US 2007/0221817 A1 Sep. 27, 2007

(51) Int. Cl.
*F16M 1/00* (2006.01)
(52) U.S. Cl. .................................... 248/647
(58) Field of Classification Search ............... 248/129, 248/676, 127, 74, 637, 646, 551; 269/89, 269/90
See application file for complete search history.

(56) References Cited

U.S. PATENT DOCUMENTS

| 5,308,094 | A | 5/1994 | McWhorter et al. |
| 5,876,173 | A | 3/1999 | English, Jr. |
| 5,957,649 | A | 9/1999 | English, Jr. et al. |
| 6,079,931 | A | 6/2000 | English, Jr. et al. |
| 6,311,992 | B1 | 11/2001 | Theising |
| 6,533,524 | B2 | 3/2003 | English, Jr. et al. |
| 6,659,706 | B2 | 12/2003 | English, Jr. et al. |
| 6,715,979 | B1 * | 4/2004 | Theising et al. ............. 414/458 |
| 6,837,665 | B2 | 1/2005 | English, Jr. et al. |
| 6,971,656 | B2 | 12/2005 | Lin |
| 7,112,028 | B2 | 9/2006 | English, Jr. et al. |

* cited by examiner

*Primary Examiner*—J. Allen Shriver, II
*Assistant Examiner*—Erin Smith
(74) *Attorney, Agent, or Firm*—Bacon & Thomas, PLLC

(57) ABSTRACT

A stand for supporting a machine includes a mounting support having legs, at least one wheel unit having a wheel holder connected to one leg by a pivotal shaft thereof and a caster or wheel connected to the wheel holder, an actuating member connected at a first pivotal location thereof to the mounting support and at least one link having an end pivotally connected to the wheel holder. The connection location of the wheel and the pivotal shaft are spaced. The connection location of the end of the link and the pivotal shaft are spaced. The other end of the link is pivotally connected to the actuating member. The connection location of the other end of the link and the first connection location are spaced. When the actuating member is pivoted, the wheel holder is pivoted by the link to move the wheel downward to engage the ground.

10 Claims, 5 Drawing Sheets

STAND FOR A MACHINE

BACKGROUND

1. Field of the Invention

The present invention relates generally to a stand for supporting a machine and more particularly, to a wheeled stand capable of lifting and transporting the machine supported on the stand.

2. Description of the Related Art

U.S. Pat. Nos. 6,311,992 and 6,533,524 respectively disclose a lift dolly for use in lifting and transporting objects. The lift dollies according to these two designs commonly include a first frame and a second frame. When a downward pressure is applied to the first frame, the second frame is rotated or pivoted in order to move the dolly to a lifted position off of the ground for transporting the object supported thereon. The transportation is accomplished via a plurality of rotatable wheels or casters that are respectively connected to the first frame member and the second frame member.

However, the aforesaid two lift dollies are so designed that the second frame is actuated to move downwardly by a downward pressure resulting from the first frame, and the connection between the two frame members is accomplished by means of a latching mechanism. With respect to the structure or operation performance, the actuation action between the two frames is not stable. Further, the latching mechanism has a complicated structure. When the latching mechanism fails to function normally, the repair work will be difficult.

SUMMARY

Embodiments of the present invention have been contemplated in view of the above noted circumstances. Thus, embodiments of the present invention provide a stand for a machine, which is capable of lifting and transporting the machine supported thereon, has a simple structure, and is easy and convenient to operate.

Accordingly, the stand for a machine provided by the disclosed embodiments includes a mounting support, at least one wheel unit, an actuating member and at least one link. The mounting support is provided for supporting the machine thereon and has a plurality of legs. The wheel unit has a wheel holder rotatably connected to one of the legs of the mounting support by a pivotal shaft thereof and a caster or wheel rotatably connected to the wheel holder. The connection location of the wheel and the location of the pivotal shaft of the wheel holder may be spaced apart from each other. The actuating member is pivotally connected at a first pivotal location thereof to the mounting support. The link has an end pivotally connected to the wheel holder of the wheel unit. The location of the pivoted end of the link and the location of the pivotal shaft of the wheel holder may be spaced apart from each other. The other end of the link may be pivotally connected to the actuating member. The location of the other pivoted end of the link and the first pivotal location of the actuating member may be spaced apart from each other. When the actuating member is actuated and pivoted, the wheel holder is respectively pivoted by the link to move the wheel downward to engage a supporting surface, thereby lifting the leg off of the supporting surface.

In one embodiment, the actuating member may include a first segment having two opposite ends respectively pivotally connected to two opposite lateral sides of the mounting support and a second segment fastened to the first segment. The longitudinal direction of the first segment may be substantially perpendicular to the longitudinal direction of the second segment.

In another embodiment, the stand may further include a locking mechanism. The locking mechanism may have a first rod member, a second rod member and a positioning member. The first rod member has an end pivotally connected to the mounting support. The second rod member has two opposite ends respectively pivotally connected to the other end of the first rod member and connected with the actuating member. When the first rod member is pivoted relative to the mounting support, the actuating member is forced to pivot relative to the mounting support by means of the second rod member. The positioning member, for example, a hook or a spring, has two opposite ends respectively connected to the first rod member and the second rod member. When the ends of the first rod member and the second rod member are stopped against each other, the pivotal joint between the first rod member and the second rod member is offset from an imaginary line passing through the two opposite ends of the positioning member.

By means of the aforesaid design, the disclosed embodiments of the stand have a simple structure and are convenient to operate, thus enhancing the convenience of using the stand.

BRIEF DESCRIPTION OF THE DRAWINGS

The disclosed exemplary embodiments will become more fully understood from the detailed description given hereinbelow and the accompanying drawings which are given by way of illustration only, and thus are not limitative of the present invention, and wherein.

DETAILED DESCRIPTION

Figure 1:
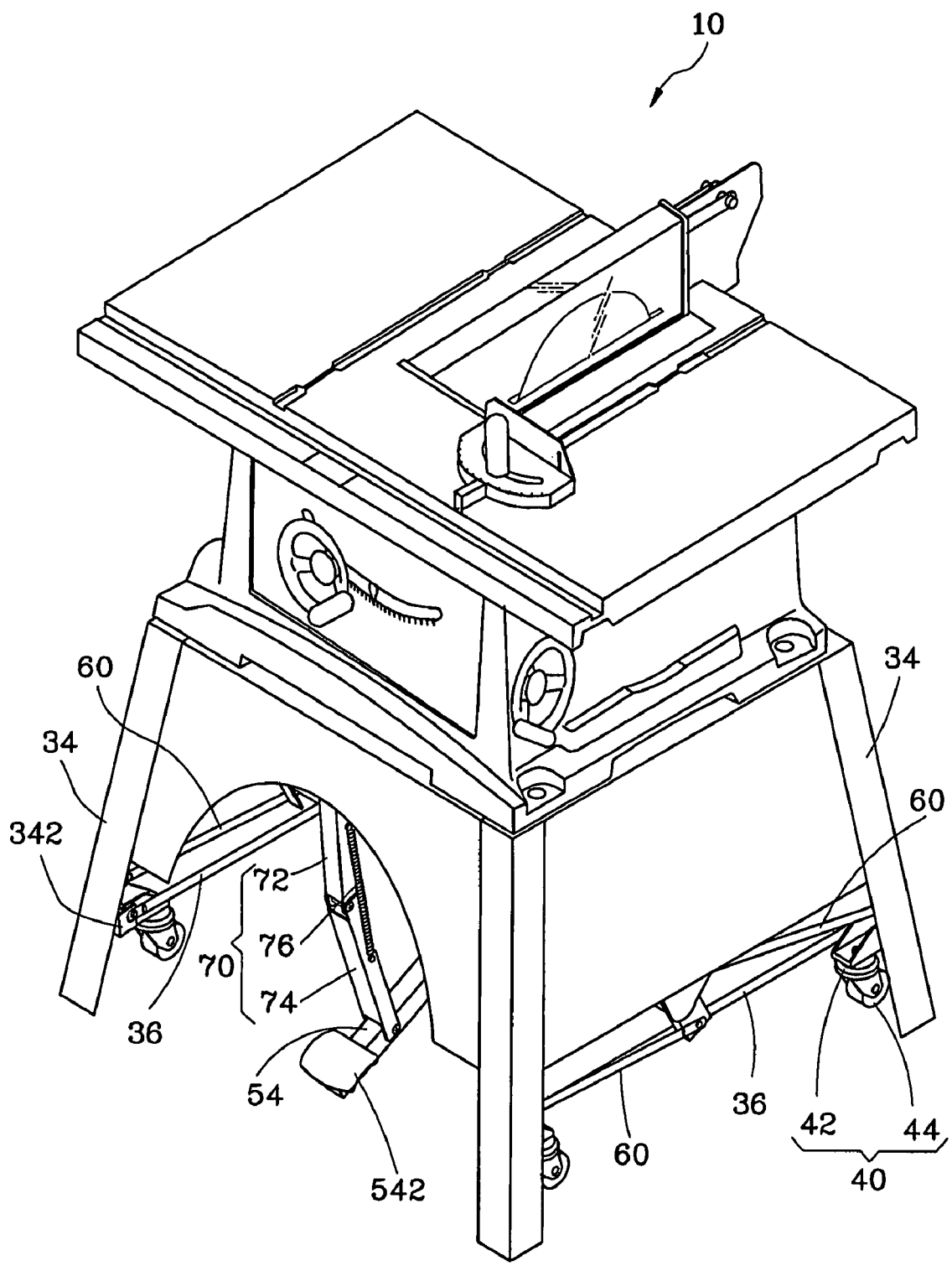
FIG. 1 is a schematic perspective drawing showing a table saw that is supported on a stand constructed according to an exemplary embodiment of the present invention.
Figure 2:
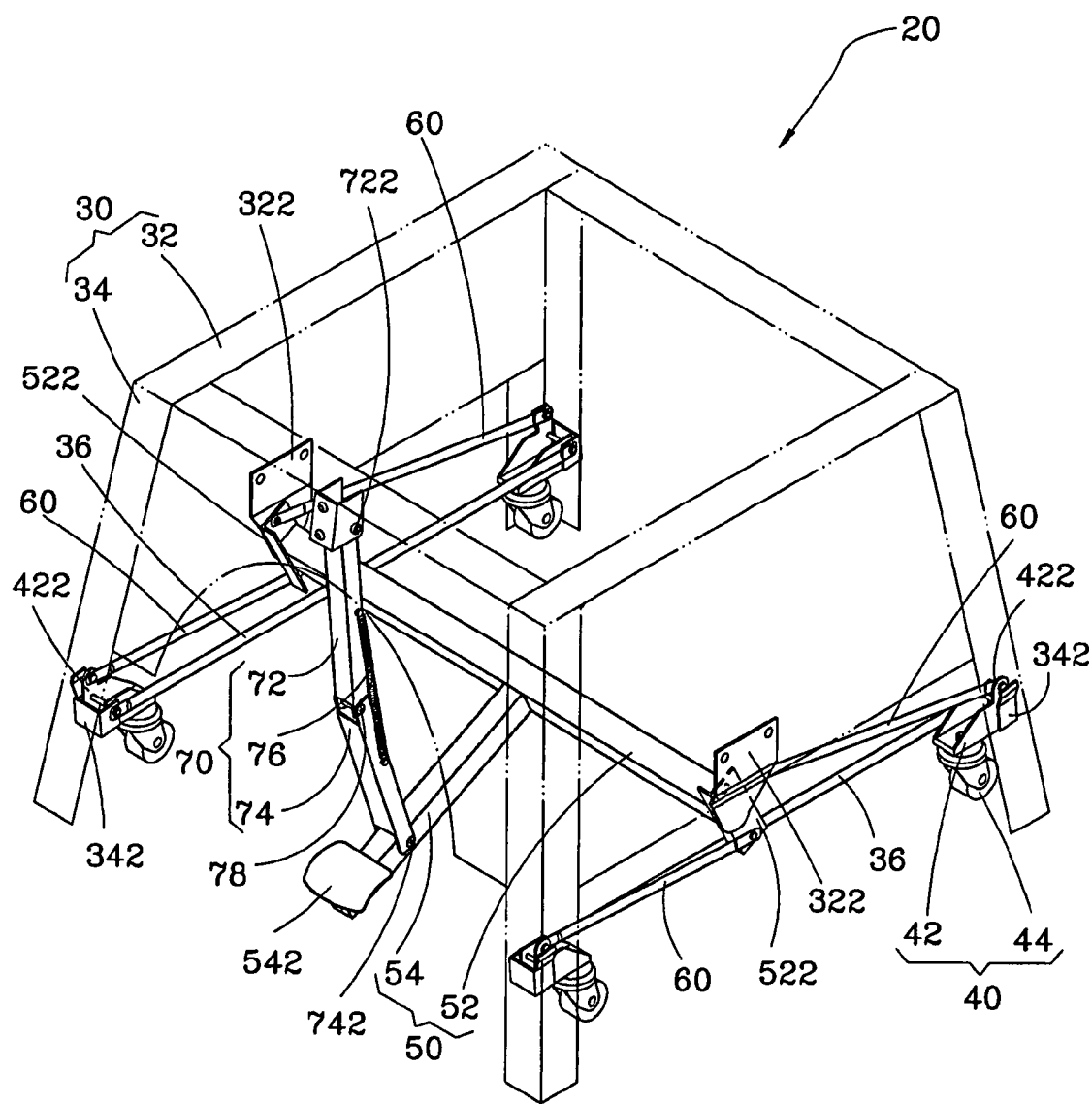
FIG. 2 is a perspective view of the stand according an exemplary embodiment.

As shown in FIGS. 1 and 2, a stand 20 in accordance with an exemplary embodiment is used for supporting thereon a machine, which is embodied as a sawing machine, such as a table saw 10, in this embodiment for illustrative purpose only. The stand 20 includes a mounting support 30, a plurality of wheel units 40, an actuating member 50, a plurality of links 60 and a locking mechanism 70.

The mounting support 30 has a bearing portion 32, which has four lateral sides connected to one another, for supporting a machine such as the saw machine 10. There are four legs 34 downwardly extending from the respective four corners of the bearing portion 32. The four legs each have an opposed end portion that engages the ground or other supporting surface in order to support the bearing portion 32 of the stand 20 in an elevated position above such supporting surface.

The mounting support 30 may also include two locating pieces 322 respectively fixedly provided at lower portions of two opposite lateral sides of the bearing portion 32. Four U-shaped connecting plates 342 may be respectively affixed to the legs 34, for example along a lower portion of the legs. The U-shaped connecting plates 342 have flanges or wings that define the U-shape of the connecting plates 342. The wings are opposed and spaced from each other in order to provide a space therebetween.

The wings that are positioned towards an interior defined by the stand 20 may be designated as inner wings. The surfaces of the inner wings facing towards the interior of the stand 20 may be designated as outer surfaces of the inner wings. Two reinforcing members 36 each having two ends respectively connected to the outer surfaces of the inner wings of two of the U-shaped connecting plates 342 may be provided in order to reinforce and stabilize the structure of the mounting support 30.

The wheel units 40 each include a wheel holder 42 and a caster or wheel 44 rotatably connected to the wheel holder 42. The wheel holders 42 of the wheel units 40 are respectively pivotally connected to the four U-shaped connecting plates 342 of the mounting support 30. Each wheel holder 42, the associated reinforcing member 36, and the associated U-shaped connecting plate 342 are connected with a single pivotal shaft so that each wheel holder 42 can be pivoted upwards and downwards relative to the associated connecting plate 342. Further, the wheel holder 42 of each wheel unit 40 has a lug 422 extending upwardly from an outer side.

Figure 3:
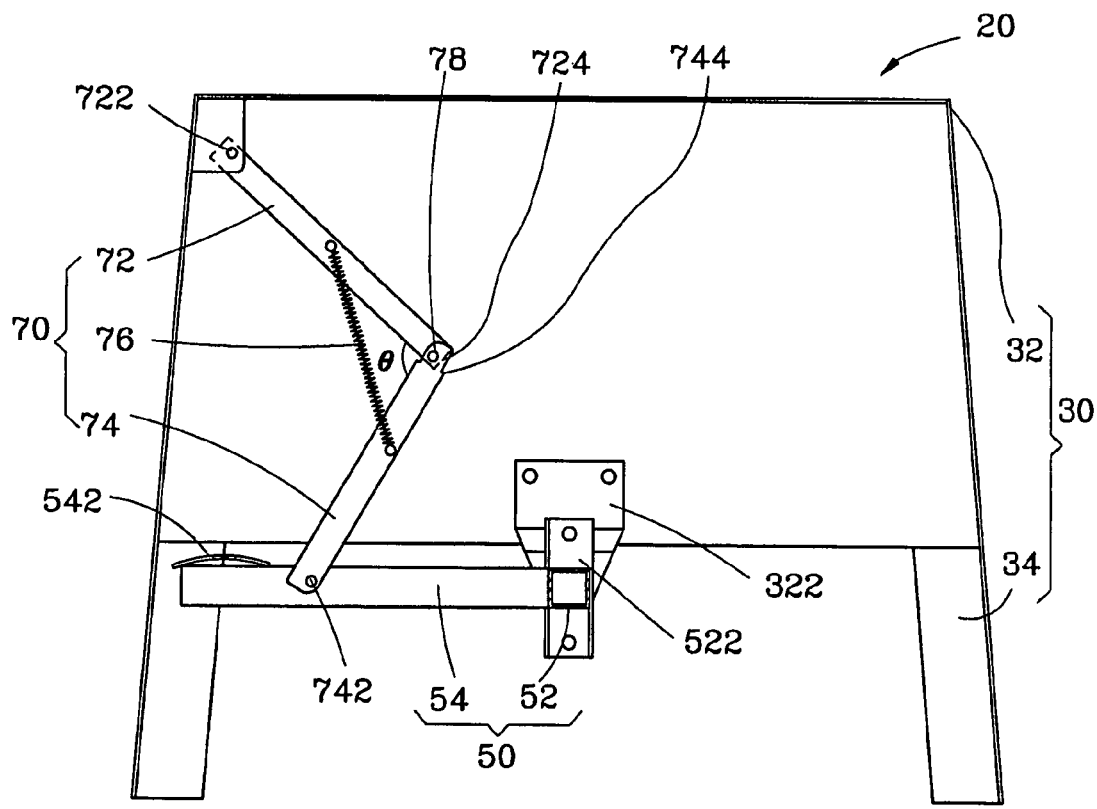
FIG. 3 is a schematic sectional view of the stand, showing the status of an actuating member and a locking mechanism of the stand while the stand is in the machine-supporting position.
Figure 5:
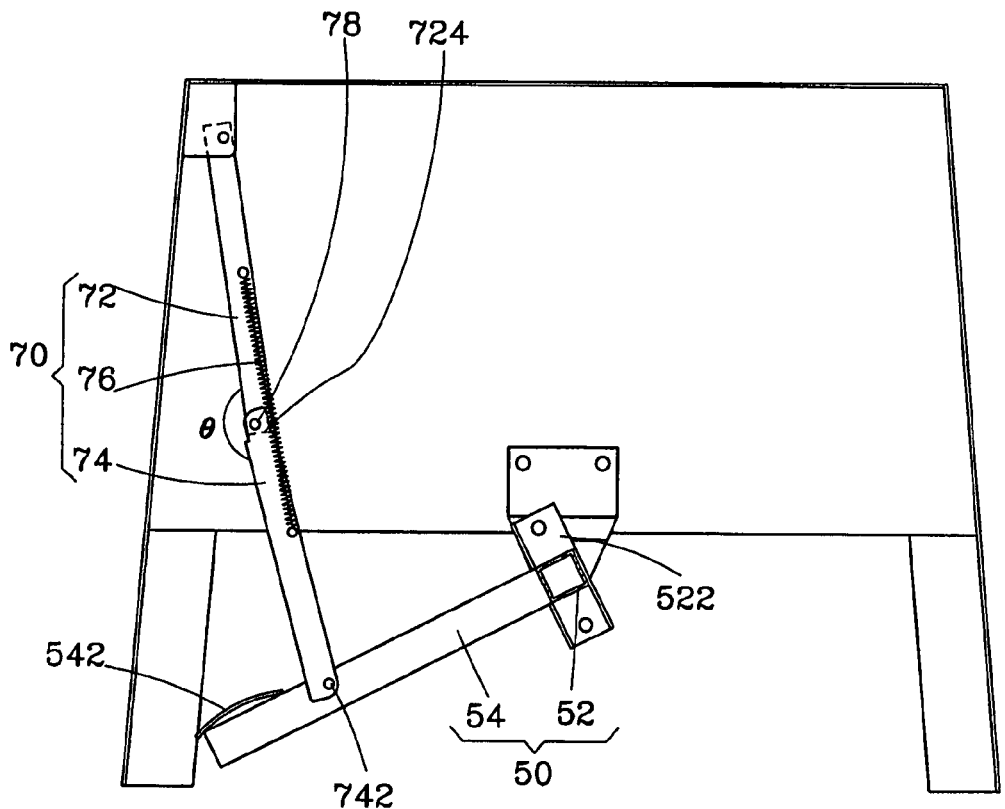
FIG. 5 is a schematic sectional view of the stand, showing the status of the actuating member and the locking mechanism of the stand while the stand is in the machine-transporting position.

Referring to FIG. 5 and FIG. 3, the actuating member 50 includes a first segment 52 and a second segment 54. The first segment 52 has a rectangular cross section. Two rectangular wing pieces 522 are respectively provided at the two distal ends of the first segment 52. The two distal ends of the first segment 52 are respectively affixed to the middle parts of the two rectangular wing pieces 522. The two rectangular wing pieces 522 are respectively pivotally connected to the locating pieces 322 of the mounting support 30.

The second segment 54 has a rectangular cross section, a front end fixedly provided with a foot pedal 542, and a rear end affixed to the middle part of the first segment 52 by welding, or any other suitable connection method, such as adhesive bonding or mechanical fastening. Therefore, the first segment 52 and the second segment 54 are fixedly connected together and shaped like a T-bar. When stepping on the foot pedal 542, the first segment 52 is pivoted with the second segment 54 relative to the mounting support 30 from a machine-supporting position to a machine-transporting position, resulting in the rectangular wing pieces 522 that are driven by the first segment 52 are pivoted relative to the locating pieces 322 of the mounting support 30.

Figure 4:
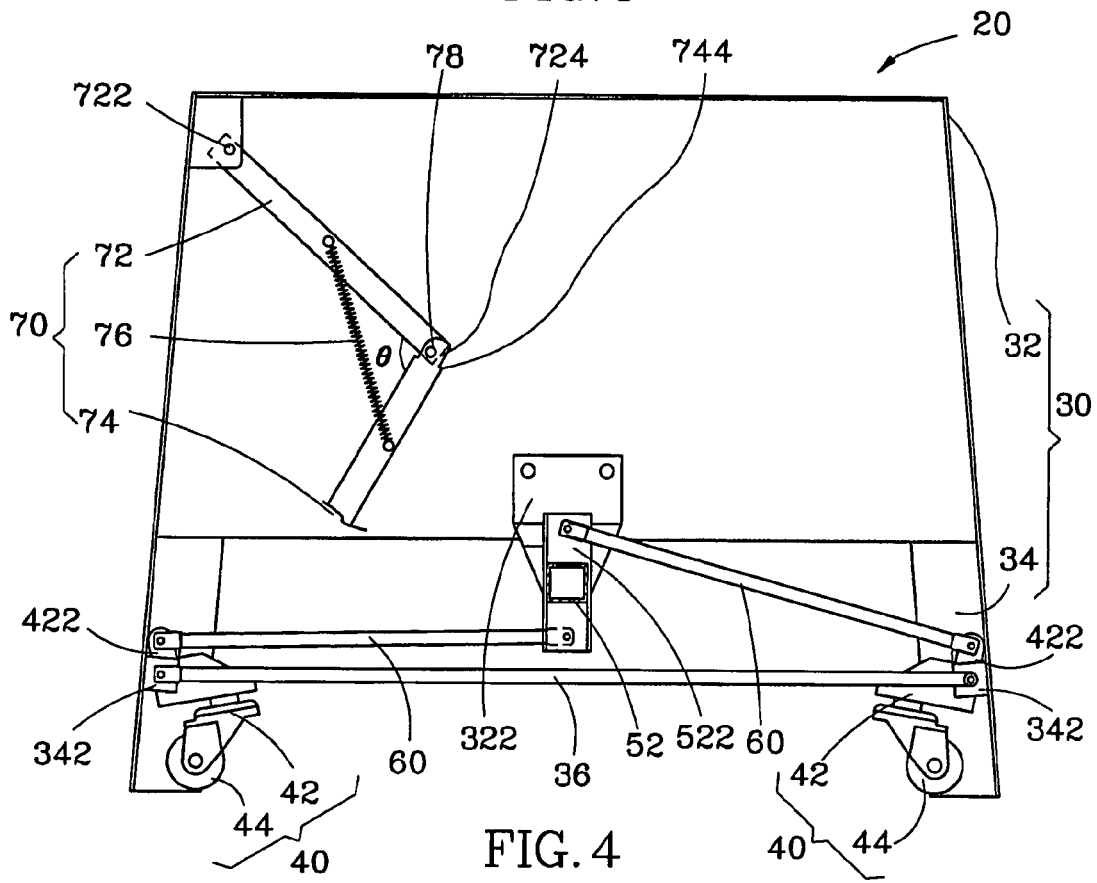
FIG. 4 is a schematic sectional view of the stand, showing the status of the links and the wheel units of the stand while the stand is in the machine-supporting position.
Figure 6:
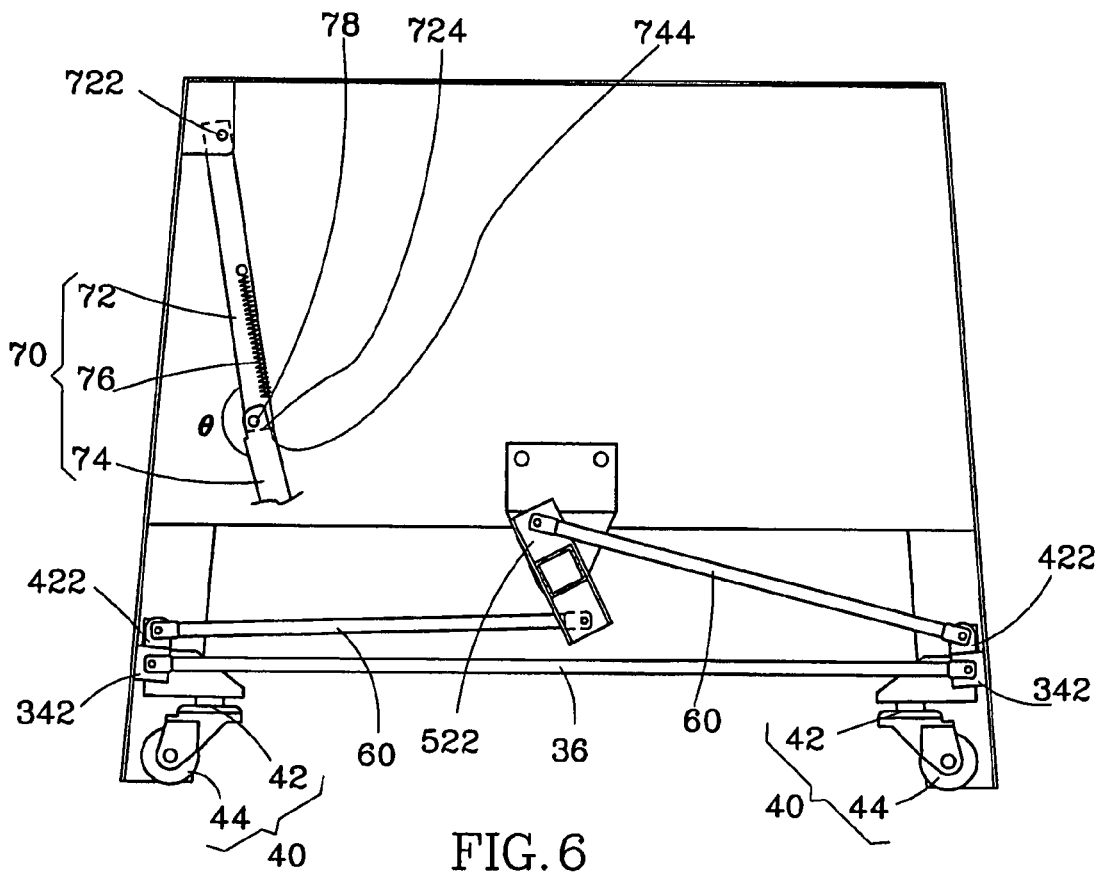
FIG. 6 is a schematic sectional view of the stand, showing the status of the links and the wheel units of the stand while the stand is in the machine-transporting position.

Referring to FIGS. 4 and 6, the links 60 each have an end pivotally connected to the lug 422 of the wheel unit 40, and the other ends of the links 60 are respectively pivotally connected to the top and bottom sides of the rectangular wing pieces 522. The links 60 that are pivotally connected to the top sides of the associated rectangular wing pieces 522 are respectively disposed at inner surfaces of the associated rectangular wing pieces 522, and the links 60 that are pivotally connected to the bottom sides of the associated rectangular wing pieces 522 are respectively disposed at outer surfaces of the associated rectangular wing pieces 522. Therefore, the links 60 are respectively disposed above and below the first segment 52 of the actuating member 50. By means of the pivoting action of the rectangular wing pieces 522, the links 60 are dragged or pushed to cause the wheel holders 42 of the wheel units 40 to be rotated upwards or downwards. When the wheel holders 42 are rotated upwards, the wheels 44 of the wheel units 40 are moved away from the supporting surface or ground in order to let the legs engage the supporting surface or ground. On the contrary, when the wheel holders 42 are rotated downwards, the wheels 44 of the wheel units 40 are moved into contact with and are supported on the supporting surface or ground.

The locking mechanism 70 includes a first rod member 72, a second rod member 74, and a positioning member 76. The first rod member 72 has its top end pivotally connected to the upper middle portion of the front side of the mounting support 30. The pivotal joint 722 between the first rod member 72 and the mounting support 30 is disposed at an offset location from the longitudinal axis of the first rod member 72 and remote from the front side of the mounting support 30, as shown in FIG. 5. The second rod member 74 has its bottom end pivotally connected to the second segment 54 near the foot pedal 542. The pivotal joint 742 between the second rod member 74 and the second segment 54 is disposed at an offset location from the longitudinal axis of the second rod member 74 and remote from the front side of the mounting support 30. The top end 744 of the second rod member 74 is pivotally connected to the bottom end 724 of the first rod member 72. Further, the pivotal joint point 78 between the first rod member 72 and the second rod member 74 is not in alignment with the pivotal joints 722 and 742, i.e., the pivotal joint 78 is located at an offset location from the longitudinal axis of the second rod member 74 and near the front side of the mounting support 30. Thus, the first rod member 72 and the second rod member 74 are pivotable relative to each other between the machine-supporting position and the machine-transporting position.

The positioning member 76, which is embodied as a spring in this embodiment for illustrative purpose, has its two distal ends respectively affixed to the middle part of a lateral side of the first rod member 72, offset from the longitudinal axis of the first rod member 72 and remote from the front side of the mounting support 30 and the middle part of a lateral side of the second rod member 74, offset from the longitudinal axis of the second rod member 74 and remote from the front side of the mounting support 30. When the second segment 54 is in the machine-supporting position, as shown in FIG. 3, the first rod member 72 and the second rod member 74 define an included angle θ that is smaller than 180°. At this time, the bottom end 724 of the first rod member 72 and the top end 744 of the second rod member 74 are not stopped against each other, and the spring power of the positioning member 76 keeps the second segment 54 in the machine-supporting position.

When the second segment 54 is in the machine-transporting position, as shown in FIG. 5, the included angle θ between the first rod member 72 and the second rod member 74 is greater than or equal to 180°. At this time, the positioning member 76 is stretched, and the bottom end 724 of the first rod member 72 and the top end 744 of the second rod member 74 are stopped against each other. As a result, the spring power of the positioning member 76 will draw and keep the first and second rod members 72,74 in the stopped position, preventing a reverse pivotal action of the first and second rod members 72,74 to the former position where the included angle θ is smaller than 180°, and the legs 34 touch the ground, i.e. the spring power of the positioning member 76 will keep the second segment 54 in the machine-supporting position.

Figure 7:
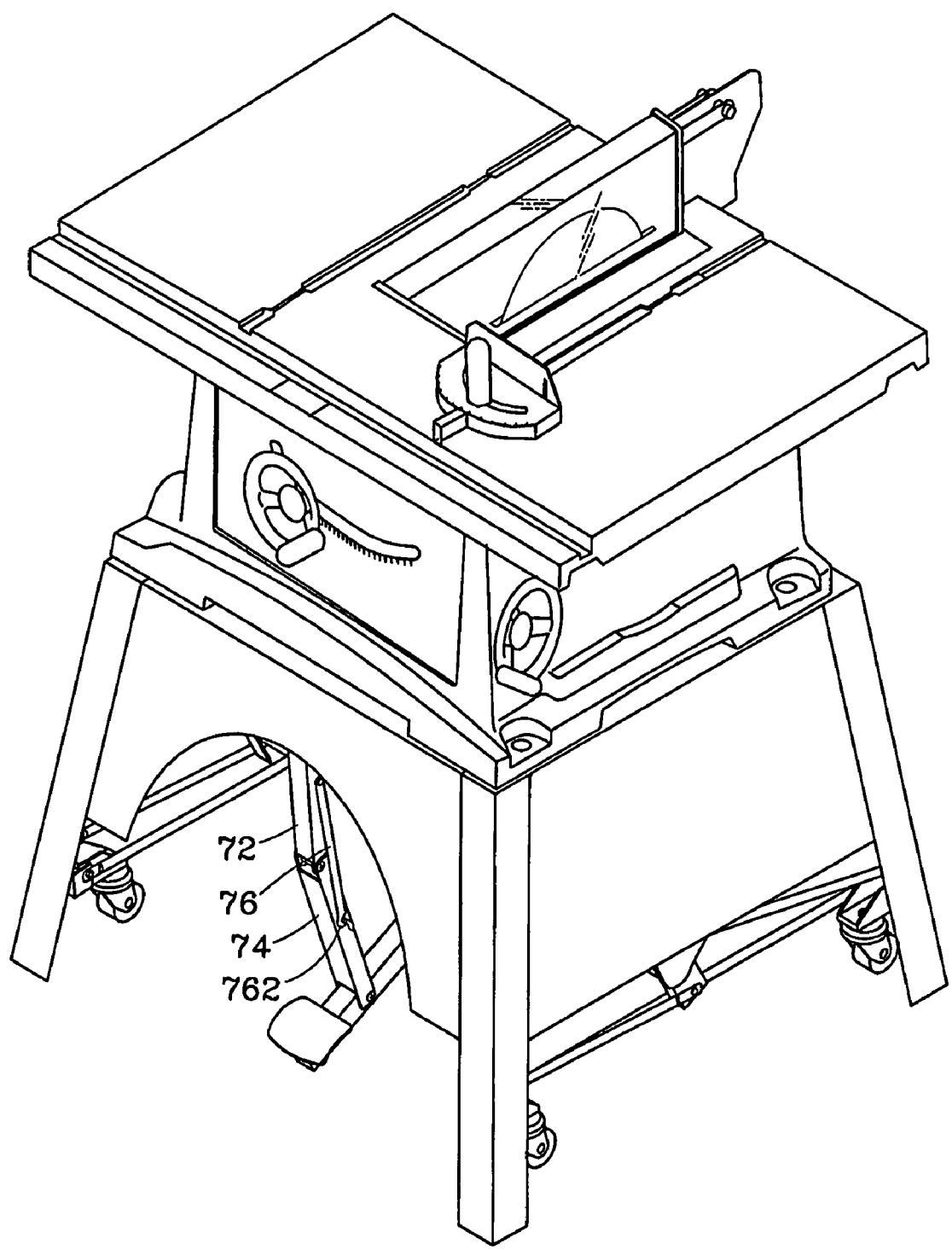
FIG. 7 is similar to FIG. 1, but showing an alternate form of a positioning member of the locking mechanism of the stand.

FIG. 7 shows an alternate form of the positioning member 76. According to another exemplary embodiment, the positioning member 76 of the locking mechanism 70 is a swivelable hook, which has a top end pivotally connected to the first rod member 72 and a bottom end terminating in a hooking portion 762 that is hooked on a part of the second rod member 74 so as to keep the second segment 54 locked in the machine-transporting position.

When the user wants to move the stand 20 to another place, one step onto the foot pedal 542 will turn the second segment 54 and the first segment 52 downwards to change the included angle θ between the first rod member 72 and the second rod member 74 to be greater than or equal to 180°, i.e. to move the second segment 54 from the machine-supporting position to the machine-transporting position, and the first rod member 72 and the second rod member 74 will be drawn by the spring power of the positioning member 76 to be kept in a locked position.

At this time, the links 60 are drawn to move toward the first segment 52 to cause the wheel units 40 to be turned or pivoted downwards, and therefore, as shown in FIG. 6, the wheels 44 of the wheel units 40 engage and push against the supporting surface or ground in order to lift the legs 34 of the mounting support 30 together off the ground. Thus, the user can move the stand 20 on the ground via the wheels 44 with less effort. After the stand 20 has been moved to the desired place, the user can push or kick forwards the first rod member 72 or the second rod member 74 in order to set down the stand 20.

At this time, the user's force, the spring power of the positioning member 76 and the gravity of the mounting support 30 enable the included angle θ between the first rod member 72 and the second rod member 74 to be returned to less than 180°, and the second rod member 74 pulls the second segment 54 upwards, thereby causing the first segment 52 to be rotated upwards. Thus, the links 60 are respectively moved toward the associated wheel units 40 in order to rotate the wheel units 40. Therefore, as shown in FIG. 4, the wheels 44 of the wheel units 40 are moved away from the supporting surface or ground, and the legs 34 of the mounting support 30 are lowered and supported on the supporting surface or ground. At this time, the user can operate the sawing machine 10 on the top side of the stand 20 in order to cut a workpiece.

As indicated above, the stand 20 has a relatively simple structure. Further, one step onto the foot pedal 542 causes the mounting support to be lifted off of the ground, enabling transport of the stand 20. Pushing or kicking the first rod member 72 or the second rod member 74 forwards causes the mounting support 30 to be returned to the machine-supporting position. In other words, the stand 20 provided by the present invention is user friendly and convenient to operate.

In another exemplary embodiment, if only one or two legs 34 of the mounting support 30 need to be controlled in order to be moved into and out of contacting the supporting surface or ground, it is sufficient to mount one or two wheel units 40 to the leg 34 or legs 34 that are to be controlled. Similarly as discussed above, the wheel unit 40 or each of the two wheel units 40 has a wheel holder 42 pivotally connected to the corresponding leg 34 of the mounting support 30 by a pivotal shaft thereof and a caster or wheel 44 rotatably connected to the wheel holder 42, wherein the connection location of the wheel 44 and the location of the pivotal shaft of the wheel holder 42 are spaced apart from each other.

An actuating member 50 is pivotally connected at a first pivotal location thereof to the mounting support 30. One link 60 or each of two links 60 has an end pivotally connected to the wheel holder 42 of the corresponding wheel unit 40, wherein the connection location of the end of the link 60 and the location of the pivotal shaft of the corresponding wheel holder 42 are spaced apart from each other. The other end of the link 60 is pivotally connected to the actuating member 50, wherein the connection location of the other end of the link 60 and the first pivotal connection location of the actuating member 50 are spaced apart from each other.

As a result, when the actuating member 50 is pivoted, the wheel holder 42 or each of the two wheel holders 42 is pivoted by the corresponding link 60 to move the corresponding wheel 44 downward to push the ground, thereby lifting the corresponding leg 34 off of the supporting surface or ground. When the actuating member 50 is pivoted in the opposite direction, the wheel holder 42 or each of the two wheel holders 42 are pivoted in the opposite direction by the corresponding link 60 in order to move the corresponding wheel 44 upward to eliminate contact with the supporting surface or the ground, thereby placing the corresponding leg 34 in supporting engagement with the supporting surface or ground.

It will be obvious that the disclosed exemplary embodiments may be varied in many ways. Such variations are not to be regarded as a departure from the spirit and scope of the invention, and all such modifications as would be obvious to one skilled in the art are intended to be included within the scope of the following claims.

What is claimed is:

1. A stand for a machine, comprising:
a mounting support for supporting the machine thereon, and having a plurality of legs;
at least one wheel unit having a pivotal shaft and a wheel holder pivotally connected to one of the legs of the mounting support by the pivotal shaft and a wheel rotatably connected to the wheel holder, wherein the connection location of the wheel and the location of the pivotal shaft of the wheel holder are spaced apart;
an actuating member pivotally connected at a first pivotal location thereof to the mounting support;
at least one link having a first end pivotally connected to the wheel holder of the wheel unit, wherein the connection location of the first end of the link and the location of the pivotal shaft of the wheel holder are spaced apart, and a second end pivotally connected to the actuating member, wherein the connection location of the second end of the link and the first pivotal location of the actuating member are spaced apart, such that when the actuating member is pivoted, the wheel holder is pivoted by the link in order to move the wheel downward for engaging a supporting surface, thereby lifting the leg off of the supporting surface; and
a locking mechanism having a first rod member with a first end pivotally connected to the mounting support, and a second rod member with first and second opposite ends respectively pivotally connected to a second end of the first rod member and pivotally connected with the actuating member such that when the first rod member is pivoted relative to the mounting support, the actuating member is forced to pivot relative to the mounting support by the second rod member.

2. The stand according to claim 1, wherein the locking mechanism further comprises a positioning member having two opposite ends respectively connected to the first rod member and the second rod member.

3. The stand according to claim 2, wherein the positioning member is a hook.

4. The stand according to claim 2, wherein the positioning member is a spring.

5. The stand according to claim 2, wherein when the second end of the first rod member and the first end of the second rod member are stopped against each other, the pivotal joint between the first rod member and the second rod member is offset from an imaginary line passing through the two opposite ends of the positioning member.

6. The stand according to claim 1, wherein the actuating member comprises a first segment having two opposite ends respectively pivotally connected to two opposite lateral sides of the mounting support, and a second segment fastened to the first segment, wherein the longitudinal direction of the first segment is substantially perpendicular to the longitudinal direction of the second segment.

7. The stand according to claim 6, wherein the second segment has a foot pedal at one end thereof remote from the first segment.

8. The stand according to claim 1, wherein the connection location of the wheel is below the pivotal shaft of the wheel holder, and the connection location of the end of the link is above the pivotal shaft of the wheel holder.

9. A stand for a machine, comprising:
   a mounting support for supporting the machine thereon, the mounting support having a plurality of legs;
   two wheel units each having a wheel holder with a pivotal shaft and a wheel rotatably connected to the wheel holder wherein the connection location of the wheel and the location of the pivotal shaft of the wheel holder are spaced apart, wherein the two wheel holders of the two wheel units are respectively pivoted on the pivotal shafts thereof to be mounted to two adjacent legs of the mounting support;
   an actuating member pivotally connected at a first pivotal location thereof to the mounting support;
   two links each having a first end pivotally connected to the wheel holder of one of the two wheel units, wherein the connection location of the first end of the link and the location of the pivotal shaft of the wheel holder are spaced apart, and a second end pivotally connected to the actuating member, wherein the first pivotal location of the actuating member is located between the connection locations of the second ends of the links such that when the actuating member is pivoted, the two wheel holders are pivoted by the two links in order to move the two wheels downward for engaging a supporting surface, thereby lifting the legs off of the supporting surface; and
   a locking mechanism having a first rod member with a first end pivotally connected to the mounting support, and a second rod member with first and second opposite ends respectively pivotally connected to a second end of the first rod member and pivotally connected with the actuating member such that when the first rod member is pivoted relative to the mounting support, the actuating member is forced to pivot relative to the mounting support by the second rod member.

10. The stand according to claim 9, wherein the mounting support comprises a reinforcing member having two ends respectively pivotally connected to the two wheel holders with the two pivotal shafts of the two wheel holders.

* * * * *